(12) United States Patent
Hohenacker et al.

(10) Patent No.: US 10,796,575 B2
(45) Date of Patent: *Oct. 6, 2020

(54) METHOD OF DETECTING VEHICLES

(71) Applicant: CLEVERCITI SYSTEMS GMBH, Munich (DE)

(72) Inventors: Thomas Hohenacker, Stamberg (DE); Konrad Prinz-Dreher, Niederstaufen (DE)

(73) Assignee: CLEVERCITI SYSTEMS GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/025,172

(22) Filed: Jul. 2, 2018

(65) Prior Publication Data

US 2019/0005819 A1    Jan. 3, 2019

(51) Int. Cl.
*G08G 1/14* (2006.01)
*G01S 13/46* (2006.01)
(Continued)

(52) U.S. Cl.
CPC .............. *G08G 1/143* (2013.01); *G01S 13/46* (2013.01); *G01S 13/878* (2013.01); *G08G 1/015* (2013.01); *G08G 1/017* (2013.01); *G08G 1/0116* (2013.01); *G08G 1/0129* (2013.01); *G08G 1/142* (2013.01); *G08G 1/144* (2013.01); *G08G 1/147* (2013.01); *H04L 63/0442* (2013.01); *H04W 4/44* (2018.02); *H04W 4/70* (2018.02); *G01S 2013/466* (2013.01)

(58) Field of Classification Search
CPC ..................................... G01S 1/00; G08G 1/00
See application file for complete search history.

(56) References Cited

U.S. PATENT DOCUMENTS

2007/0247333 A1* 10/2007 Borean .................. G07B 15/02
340/932.2
2008/0258934 A1    10/2008 Chemali
(Continued)

FOREIGN PATENT DOCUMENTS

DE    10 2008 006356 A1    7/2009
DE    10 2013 004 493 A1    9/2014
(Continued)

OTHER PUBLICATIONS

European Search Report dated Nov. 22, 2018 in connection with German Patent Application No. 18181328.8.

*Primary Examiner* — Shirley Lu
(74) *Attorney, Agent, or Firm* — Amster, Rothstein & Ebenstein LLP

(57) ABSTRACT

The invention relates to a method of detecting vehicles that park in a parking space zone, wherein
excluded zones are recognized and/or determined that are not suitable and/or provided for parking vehicles;
a transponder (40) is arranged in or at a vehicle,
the transponder automatically repeatedly transmits a recognition signal;
the recognition signal is received by at most three radio devices; and
the position of the transponder is determined by means of a control device with reference to the time of flight and/or to the time of flight differences of the recognition signal from the transponder to the radio devices and with reference to the positions of the excluded zones.

19 Claims, 3 Drawing Sheets

Figure 1:
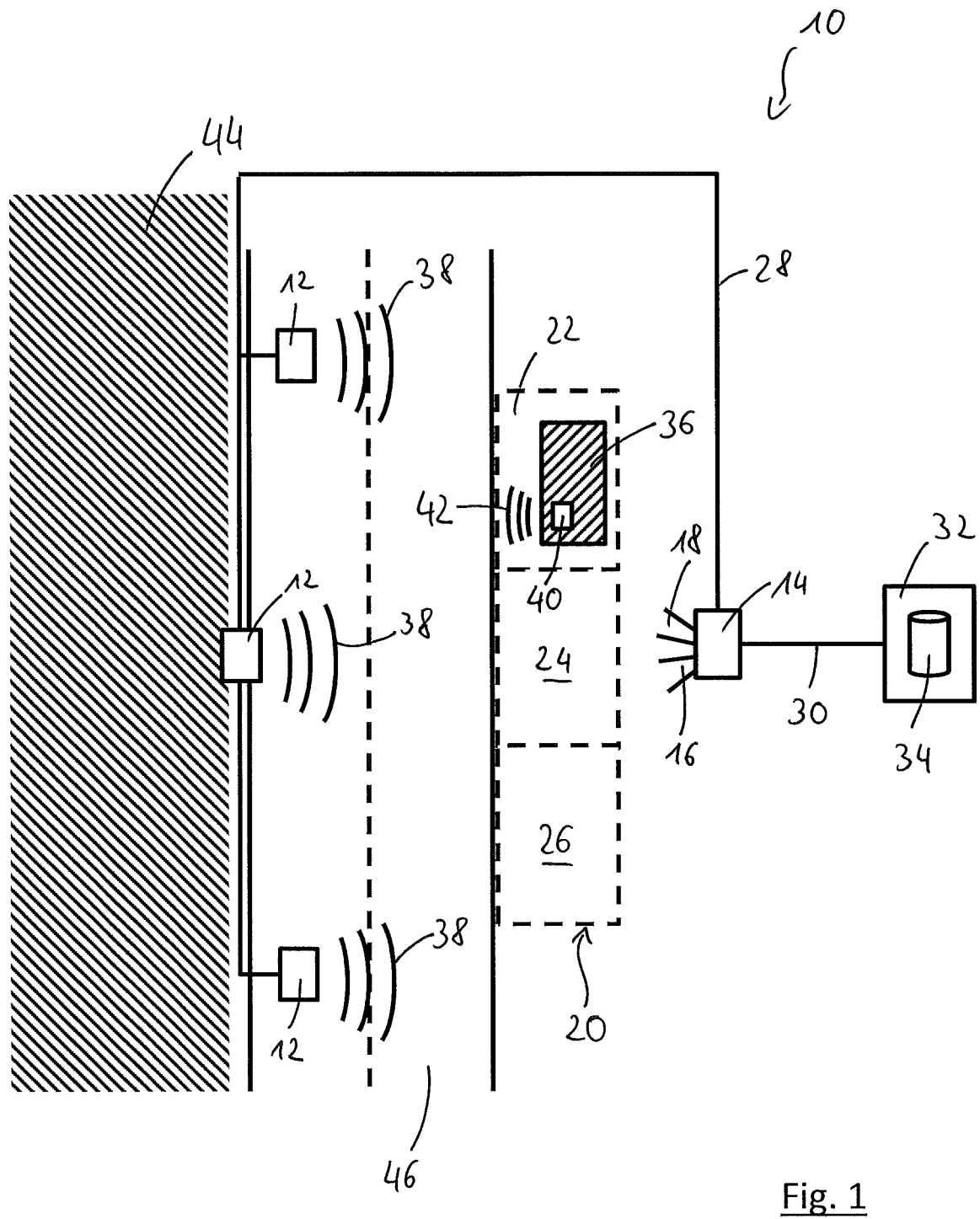

(51) Int. Cl.
    *G08G 1/017*     (2006.01)
    *G08G 1/015*     (2006.01)
    *G08G 1/01*     (2006.01)
    *G01S 13/87*     (2006.01)
    *H04W 4/44*     (2018.01)
    *H04W 4/70*     (2018.01)
    *H04L 29/06*     (2006.01)

(56) References Cited

U.S. PATENT DOCUMENTS

| | | | |
|---|---|---|---|
| 2012/0056758 A1* | 3/2012 | Kuhlman | G08G 1/14 340/932.2 |
| 2012/0236149 A1* | 9/2012 | Nagy | E04H 6/426 348/148 |
| 2014/0315582 A1* | 10/2014 | Dong | H04W 64/00 455/456.2 |
| 2015/0178640 A1* | 6/2015 | Balakrishnan | G06Q 50/30 705/13 |
| 2015/0221140 A1* | 8/2015 | Eid | G07B 15/063 705/13 |
| 2015/0356498 A1* | 12/2015 | Casanova | G06Q 10/087 705/13 |
| 2016/0042643 A1 | 2/2016 | Hohenacker | |
| 2016/0140846 A1* | 5/2016 | Outwater | G08G 1/144 340/932.2 |
| 2018/0322710 A1 | 11/2018 | Hohenacker | |

FOREIGN PATENT DOCUMENTS

| | | |
|---|---|---|
| DE | 102016106513 A1 | 10/2017 |
| WO | 2017072286 A1 | 5/2017 |

\* cited by examiner

METHOD OF DETECTING VEHICLES

The present invention relates to a method of detecting vehicles that are parked in or on a parking space zone.

Finding a free parking space (i.e. a free parking bay) can be laborious and time consuming on large parking space zones, in particular on large corporate car parks having several hundred or even several thousand parking spaces, due to the large area over which such parking spaces extend.

There is therefore an interest in knowing the occupation status of parking bays and in communicating it to users of the parking bays where possible.

To recognize the occupation status of parking bays, transponders can, for example, be used that transmit recognition signals, with the position of the transponder being able to be determined with reference to the recognition signals. If the transponder is fastened to a vehicle, a conclusion can be drawn via the position of the transponder on the position of the vehicle and on the parking bay used and thus occupied.

To recognize the position of the transponder, the recognition signals of the transponder are typically received by a plurality of radio devices, with the position of the transponder being determined by means of trilateration. It is disadvantageous here that a plurality of radio devices have to be kept available, which increases the effort for the position determination of the transponder.

It is the object underlying the invention to provide a method of detecting parked vehicles that minimizes the effort for detecting the parked vehicles.

This object is satisfied in accordance with the invention by a method in accordance with claim 1.

In accordance with the method of the invention
excluded zones are recognized and/or determined that are not suitable and/or not provided for parking vehicles;
a transponder is arranged in or at a vehicle;
the transponder automatically repeatedly transmits a recognition signal;
the recognition signal is received by at most three radio devices; and
the position of the transponder is determined by means of a control device with reference to the time of flight and/or to the time of flight differences of the recognition signal from the transponder to the radio devices and with reference to the position of the excluded zones.

At least four radio devices would typically be required for the position determination of a transponder in three dimensional space which determine a respective distance of the transponder from the respective radio device with reference to the time of flight and/or with reference to time of flight differences of the recognition signal. An unambiguous position of the transponder can then be determined from the four distance values determined in this manner.

In accordance with the invention, however, a maximum of three radio devices are used, with the actual position of the transponder being able to be limited to only two possible positions with three radio devices. Due to the making use of the excluded zones, however, one of the two positions can be excluded (if one of the two positions is in the excluded zone) since it is assumed that the parking vehicle is not in the region of the excluded zone.

By using at most three radio devices, the effort for the position determination of the transponder can be reduced, whereby the detection of vehicles can be performed at lower cost and thus more economically.

An excluded zone can, for example, be understood as a no-parking zone, as the location of a building, as a green space and/or as pedestrian zones. All these areas are not suitable for parking vehicles and/or are not intended for parking vehicles. All the areas can in particular be considered as excluded zones outside the parking space zone. The excluded zones can be a continuous area. It is likewise possible that a plurality of non-adjacent areas together form the excluded zones.

It is likewise possible that the method in accordance with the invention is also used in buildings (i.e. indoors), for example in multistory car parks. The excluded zones can then e.g. be stairwells or zones outside the building. The method in accordance with the invention can also be used simultaneously in buildings and outdoors and thus e.g. enable a seamless monitoring of parked vehicles, e.g. in large shopping malls.

The excluded zones can e.g. be automatically recognized by the control device and/or can, for example, be stored in the control device on the installation of the control device.

Specific aspects of the method in accordance with the invention will be explained in even more detail in the following.

In accordance with the invention, the transponder is attached in or to a vehicle whose position is to be determined by means of the recognition signal. A recognition signal can in particular also be understood as a plurality of signals that are spaced apart in time and that are e.g. periodically transmitted by the transponder. The transponder can preferably be prompted to transmit the recognition signal by the radio devices. The radio devices can e.g. transmit broadcast signals (i.e. request signals) repeatedly for this purpose. The broadcast signals can be received by one (or each) transponder. After the reception of the broadcast signal, the respective transponder can automatically reply with a recognition signal.

The vehicles can, for example, be passenger cars, trucks, motorcycles, bicycles, trailers and the like. It is likewise possible that the vehicles are ships or aircraft. In this case, the parking bays can be mooring stations of a port or park positions at an airport.

A parking space zone designates a surface area in which a plurality of parking bays are located. A parking bay can also be called a single parking space, that is one parking bay typically provides space for one vehicle. The parking bays can have different sizes and can thus, for example, be adapted to the size of passenger cars, trucks or bicycles.

The transponder arranged in or at the vehicle can, for example, be taken along in the glove compartment or behind the windshield and can comprise a battery or a rechargeable battery for the power supply. The transponder can also be attached to an outer surface of the vehicle or can be fixedly installed in a rear view mirror of the vehicle. The transponder can in this case be coupled to the electric onboard network of the vehicle. The transponder can, for instance, have the size of a cigarette pack, of a matchbox, or of a credit card and can automatically transmit the recognition signal. The automatic transmission can here take place in unchanging time intervals without an influence from the outside. Alternatively, the transponder can automatically transmit the recognition signal as a reply to a request signal arriving from outside (e.g. the above-named broadcast signal) that is e.g. transmitted by the radio device. The recognition signal and the request signal can be radio signals. A time of flight of the recognition signal can be determined from the time difference between the transmission of the request signal and the reception of the recognition signal. The processing time of the transponder can preferably be subtracted from the time difference for this purpose.

The recognition signal is received by the radio device (also called an armature) or by the radio devices. The following statements relate both to a respective single radio device and to all the radio devices. The radio device can be attached in a fixed position, for example at an elevated position, at or in an illumination device of the parking space zone. The radio device is preferably configured for an omnidirectional reception of the recognition signal. Alternatively, the radio device can also have a directionality for the reception and transmission of radio signals.

The radio devices are preferably coupled to the control device, with the control device being able, for example, to determine time of flight differences with respect to the different radio devices. The control device can determine the position of the transponder from the time of flight differences while making use of the known positions of the excluded zones. The positions of the radio devices in three dimensional space can be known to the control device for this purpose.

The position and/or the boundary of the parking space zone in three dimensional space can likewise be known to the control device.

The radio devices are in particular arranged in a fixed position and are preferably spaced apart from one another.

In the determination of the position of the transponder, the control device can determine a relative position of the transponder, i.e. a position relative to e.g. one of the radio devices. Alternatively, the control device can also determine an absolute position of the transponder, for example its GPS coordinates. The relative position or absolute position is preferably determined as a position in three dimensional space.

The position of the transponder or of the vehicle can moreover be determined or calculated a plurality of times with reference to a plurality of consecutive recognition signals, whereby the accuracy of the position determination can be increased, for example by averaging. It can moreover be recognized that a vehicle has parked with the multiple position determination. This can preferably take place in that a position of the transponder is determined that remains the same over a predefined time period.

On the trilateration of the position of the transponder, the distance of a respective radio device from the transponder is preferably determined with reference to the time of flight of the recognition signal and/or of the request signal. The distance thus determined produces a spherical volume around the respective radio device, with the transponder having to be at a point of the surface of the spherical volume. Three spherical volumes in particular result on a use of e.g. three radio devices. The surfaces of all three spherical volumes ideally each intersect at the above-named two possible positions of the transponders.

The method in accordance with the invention can in particular be carried out repeatedly, with the method, for example, being repeated for each new vehicle entering the parking space zone. Recognition signals are preferably transmitted and/or requested almost constantly (e.g. several times a second) so that the change of position of a vehicle can be tracked. A plurality of transponders (and thus a plurality of vehicles) can also be localized simultaneously, whereby large parking space zones can also be monitored.

Advantageous further developments of the invention can be seen from the description, from the drawings, and from the dependent claims.

In accordance with a first advantageous embodiment, exactly three radio devices are used for the reception of the recognition signal, with the three radio devices being arranged along a line deviating from a straight line. This means a straight line that runs through two of the three radio devices does not also run through the third radio device. The radio devices can in particular be arranged such that no axis of symmetry and/or no point symmetry result(s) for the positions of the radio devices. Cases of symmetry in which three radio devices can also deliver more than two possible positions of the transponder (for example when the transponder is located on an axis of symmetry of the radio devices) can be reduced by the arrangement of the radio devices in this manner, i.e. the arrangement e.g. not along a straight line. The reliability of the position determination is hereby increased.

In accordance with a further advantageous embodiment, the radio devices are arranged at at least two different heights above the ground of the parking space zone. A common reference surface for all of the radio devices is to be understood as the ground of the parking space zone. The above-named cases of symmetry can also be further reduced by the different heights, whereby the reliability of the position determination can be further increased.

In accordance with a further advantageous embodiment, exactly two radio devices are used for the reception of the recognition signal. The two radio devices can likewise be arranged at different heights above the floor of the parking space zone.

On the use of exactly two radio devices, the height of the transponder in or at the vehicle can be known and/or communicated to the control device, wherein the control device also determines the position of the transponder with reference to the height of the transponder.

On the use of two radio devices, a circle disposed in three dimensional space (the intersection circle of the surfaces of two spherical volumes) results on the trilateration of the transponder for the possible position of the transponder. Due to the known height of the transponder in or at the vehicle, only two possible positions then remain that are both on the circle and satisfy the condition of the height of the transponder (i.e. the circle in space is intersected e.g. by a plane extending in parallel with the ground at the height of the transponder). One of the two possible positions can be eliminated by the additional use of the excluded zones so that the position of the transponder can also be unambiguously determined with two radio devices.

The height of the transponder can be the height of the transponder above the ground on the which vehicle stands. Due to the known position and also due to the known height of the parking space zone, the absolute height of the transponder can also in particular be determined.

The height of the transponder in or at the vehicle can also be known on the use of three radio devices, whereby the accuracy of the position determination can be further improved with three radio devices.

In accordance with a further advantageous embodiment, the height of the transponder is included in the recognition signal. The height can, for example, be determined on the installation of the transponder into the vehicle and can be stored in the transponder. The transponder can then also transmit its installation height with every recognition signal. Alternatively or additionally, the control device can comprise a database in which the heights of the respective transponders are stored. Further alternatively or additionally, the height of the transponder can be estimated by the control device since the transponder can e.g. be arranged in the region of the windshield or in the glove compartment.

It is possible on the actual carrying out of the position determination of the transponder that due to inaccuracies in the time of flight measurement, the distance of the transponder from a radio device is not completely correctly determined. For example, a measurement inaccuracy of the radio device in an order of magnitude of approximately 10 cm to 20 cm can occur. Due to the measurement inaccuracy, it is not possible e.g. on the use of three radio devices for two points of intersection of the respective three spherical volumes to be produced; it is rather the case that more than two points of intersection can be present between a respective two of the surfaces of the spherical volumes.

At least three points of intersection, preferably at least six points of intersection, of the spherical volumes are preferably determined in the event of measurement inaccuracies. Subsequently, a convex polyhedron can be determined on whose surfaces the at least three or the at least six points of intersection are disposed. If the points of intersection of the spherical volumes lie in one plane (for example because the installation height of the transponder is known), a convex polygon that includes the points of intersection or is defined by the points of intersection can also be used instead of the convex polyhedron. If more than three or six points of intersection are known, those three or six points of intersection are used that have the smallest distance from one another. Finally, the balance point of the polyhedron or of the polygon can be determined. The balance point can then be used as the possible or actual position of the transponder, with the positions of the excluded zones in particular also being included in the position determination.

It is possible that a total of more than two or three radio devices are used, with a respective two or three radio devices being able to be combined as a group to carry out the method in accordance with the invention (within the group).

The group of three radio devices is preferably selected from all the radio devices such that the three selected radio devices are each adjacent (i.e. no radio device is skipped). The three selected radio devices can moreover be positioned such that a first radio device has a first distance from a second radio device and a second distance from a third radio device, with the second distance being larger than the first distance. A third distance between the second and third radio devices is smaller than the second distance here. As an additional condition, the three radio devices can be selected such that the spacing of the first radio device from the transponder is larger than the respective distance of the second and third radio devices from the same transponder. Two radio devices can hereby be selected that are disposed "in front of" the transponder (namely the first and second radio devices) and one radio device that is disposed "behind" the transponder (the third radio device). On such a selection of the radio devices that is shown, for example, in FIG. 1 that is explained later here, good results can be achieved or the position determination of the transponder.

In accordance with a further advantageous embodiment, a straight connection line extends between a respective two of the radio devices (in the plan view) outside the parking space zone. This means that the radio devices can all be located, for example, at the same side and outside the parking space zone. In other words, the straight connection line does not run above the parking space zone. It is of advantage here that the possible two positions determined e.g. with three radio devices are then located in the region of the parking space zone, on the one hand, and with high probability outside the parking space zone (and thus in the excluded zone), on the other hand. The correct position of the transponder can hereby then be selected with a high probability and can be evaluated as the location of a vehicle.

In accordance with a further advantageous embodiment, the radio devices can communicate with one another to determine the distance between a respective two of the radio devices by means of a time of light determination of the signal. It is of advantage here that the accuracy of the distance measurement can be increased by such a procedure (if, for example, the relative positions of the radio devices are very accurately known).

In accordance with a further advantageous embodiment, parking bays are recognized and/or determined in the parking space zone before the determination of the position of the transponder. The parking bays within the parking space zone can be determined at one time, for example. Alternatively, the parking bays can also be recognized with reference to the position of vehicles or their transponders. In addition, areas can also be fixed or determined in which parking is generally unwanted or prohibited (prohibited zones). Such areas can for example be a street or a fire engine access zone. These areas can then be added to the excluded zones.

In accordance with a further advantageous embodiment, the control device determines an identification of the transponder with reference to the recognition signal, with it also being determined with reference to the recognition signal whether the vehicle has parked. If the vehicle has parked in one of the parking bays, the identification of the transponder and the parking bay used by the vehicle are transmitted to a registration server, with the registration server outputting a status signal for the parking bay used with reference to the identification of the transponder. The registration sensor can also output a respective status signal for a plurality or for all of the parking bays of the parking space zone. Alternatively, the occupation of a plurality or of all the parking bays of the parking space zone can be included in a single status signal. The status signal can e.g. be output in the form of a digital data signal. The status signal can in particular also be forwarded to a car park routeing system that routes car drivers to the parking space zone on the presence of free parking bays.

In accordance with a further advantageous embodiment, the registration server determines an authorization status for the parking bay used with reference to the identification of the sensor, with the authorization status being included in the status signal. This means that the registration server checks whether an authorization to park on the respectively used parking bay is associated with the identification of the transponder or not. For this purpose, a look-up table can be present in the registration server in which the respective authorizations are entered for each transponder (and thus for the corresponding user and/or for the corresponding vehicle). For example, the authorization to park in parking bays that are reserved for electric cars can be entered in the look-up table for a transponder that is associated with an electric car.

Accordingly a required authorization to park can be determined for parking bays of the parking space zone. It can, for example, be indicated that predefined parking bays may only be used by electric cars and/or only by members of management of a company.

The transponder is further preferably configured to recognize a movement of the vehicle, wherein a frequency of occurrence of the transmission of recognition signals after a predefined time period without a movement of the vehicle is reduced or a transmission of the recognition signal is fully suppressed. This means that a frequency of occurrence of the transmission of recognition signals can be designed as variable, in particular in dependence on movements of the vehicle. It can hereby be achieved that the transponder of a stationary or parked vehicle does not unnecessarily transmit a large number of recognition signals. Energy can be saved in the transponder in this manner. In addition, the radio device is not confronted with too many recognition signals so that the individual recognition signals can be localized better. For example, the frequency of occurrence of the recognition signals can be reduced 5 or 10 minutes after the last recognized movement of the vehicle. To recognize movements of the vehicle, the transponder can comprise a GPS system, can make use of a GPS system of the and/or can comprise an acceleration sensor and/or a gyroscope. A parking direction can be determined by means of a compass integrated in the transponder and can be transmitted to the radio devices. The position of the vehicle can be further narrowed down by the detection of the parking direction, for example when it is known that vehicles always park on parking spaces in the same direction along a specific side of the street. A further radio device can hereby optionally be saved.

If the vehicle leaves its parked position, this change of status can e.g. be recognized by means of the acceleration sensor, whereupon the frequency of occurrence of the transmission of recognition signals can be increased again. In addition, the transponder can comprise an RFID chip that can be read by car park supervision personnel in order e.g. to read authorizations of the transponder. The RFID chip can also serve e.g. to achieve access to garages or to parking bays secured by means of barriers.

In accordance with a further advantageous embodiment, status signals relating to a plurality of parking bays are communicated to a car park server and/or to a mobile display device, wherein the car park server and/or the mobile display device display(s) an overview of free and occupied parking bays with reference to the status signals. The mobile display device can in particular be a cellular telephone that indicates the free and occupied parking bays by means of an app. The car park server can present the free and occupied parking bays by means of a web page. The car park server and/or the mobile display device can access the registration serve to request information on occupied and free parking bays.

In accordance with a further advantageous embodiment, the transponder transmits the recognition signal in encrypted form, with the recognition signal in particular being generated by means of an asymmetrical encryption method. It can hereby be suppressed that the recognition signal of the transponder is intercepted, copied, and transmitted again by a third party to imitate the original transponder. It is made more difficult in this manner that the identity of the transponder is stolen. The recognition signal can preferably have a variable portion, for example a time stamp, a random number, or a part of the request signal, with the variable portion likewise being encrypted. The imitation of the recognition signal can hereby be made yet more difficult.

The invention further relates to a system comprising at least one transponder, up to three radio devices, and a control device. The system in accordance with the invention is characterized in that it is configured to carry out the above-described method.

In accordance with an advantageous further development, the radio devices are attached in or to streetlamps, to building fronts, to street signs and/or to traffic lights. This means that the radio devices can be arranged in an elevated position above the ground, whereby a good reception of the recognition signals results.

The radio devices can also use the power supply of the streetlamp or of the traffic lights; the installation effort and/or cost for the radio devices can hereby be reduced. Alternatively or additionally, the radio devices or the total system can be supplied with electric energy from solar cells.

The transponder and the radio devices are preferably configured for a radio communication in the frequency range from approximately 2.4 GHz or 5 GHz, with a frequency range of 2.2 GHz up to 2.6 GHz, for example, being able to be used. The transponder and the radio device in particular use wireless LAN, Bluetooth and/or ZigBee. The ISM band is preferably used that is in the range from 2.4 GHz. It is equally possible to use other technologies such as LoRaWan (long range wide area network), NB-IOT (narrow band internet of things) and/or 4G (fourth generation of cellular radio, e.g. LTE Advanced).

The recognition signals can be so-called "chirp" pulses having a changing frequency, with the transmission frequency being changed from a start frequency up to an end frequency during a pulse. The frequency change provides the possibility of also reliably detecting the recognition signal with a broadband background radiation.

In accordance with an advantageous embodiment of the system in accordance with the invention, a monitoring system is provided for the optical, at least regional detection of the parking space zone, with the monitoring system comprising a camera system and a recognition unit that is configured to recognize free and occupied parking bays, in particular by means of image processing, preferably using individual frames. An addition check of the parking situation can take place by the monitoring signal in addition to the recognition of parked vehicles with reference to the transponders and their recognition signals.

The camera system can be installed and aligned for this purpose such that it preferably detects a respective plurality of parking bays of the parking space zone. The camera system can detect image information that are called image indications in the following. The image indications of the parking bays delivered to the recognition unit can therefore, for example, be image recordings of the complete parking bays or also only images of part areas of the parking bays. The recognition unit can then determine an occupation status of a respective parking bay with reference to the image indications. A parking bay is preferably only recognized as occupied by the control device when both a signal of the transponder and the image indications of the camera system indicate that the respective parking bay is occupied.

In another respect, the statements made on the method in accordance with the invention apply accordingly to the statements on the system in accordance with the invention, in particular with respect to advantages and preferred embodiments.

Figure 2:
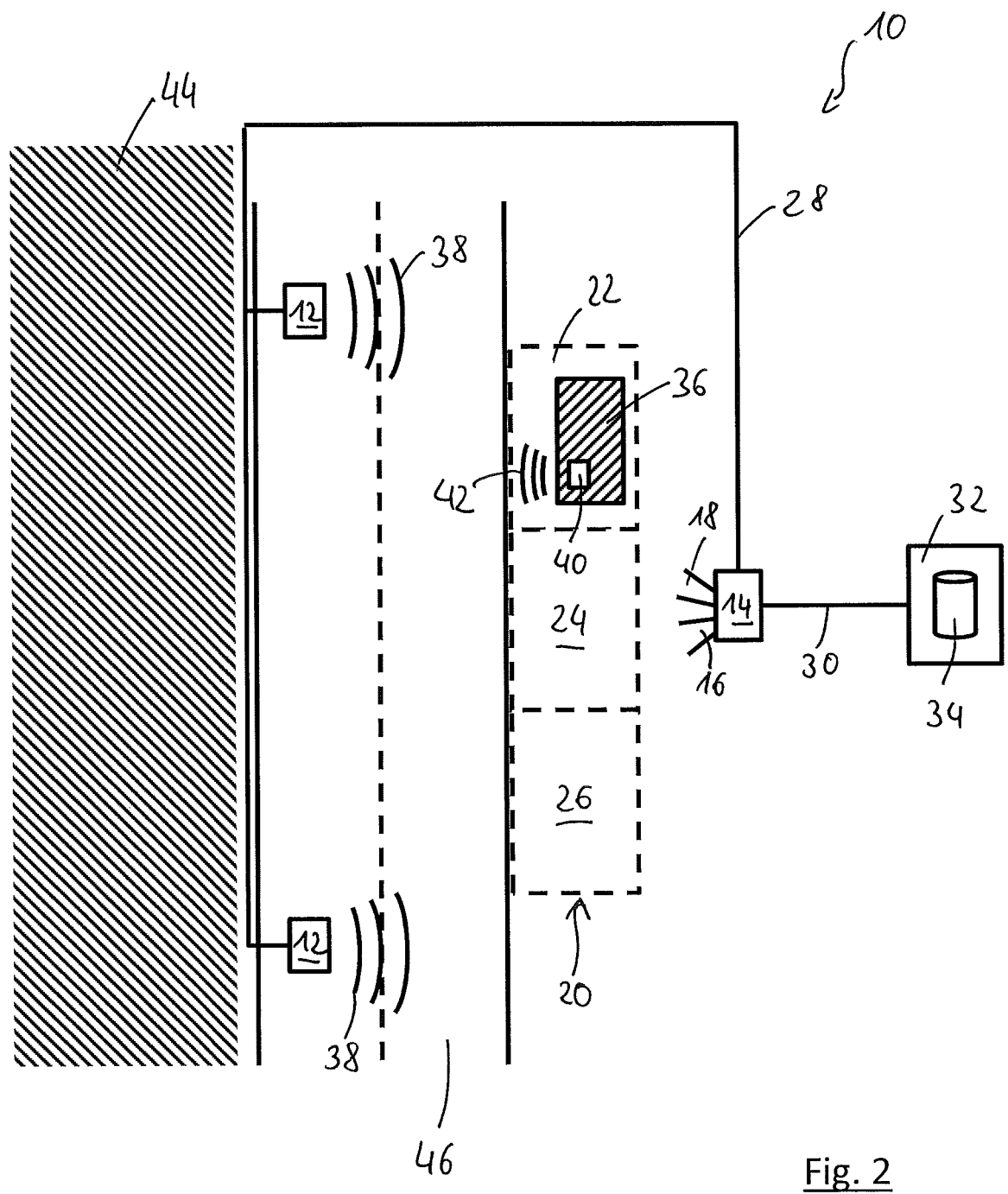
Figure 3:
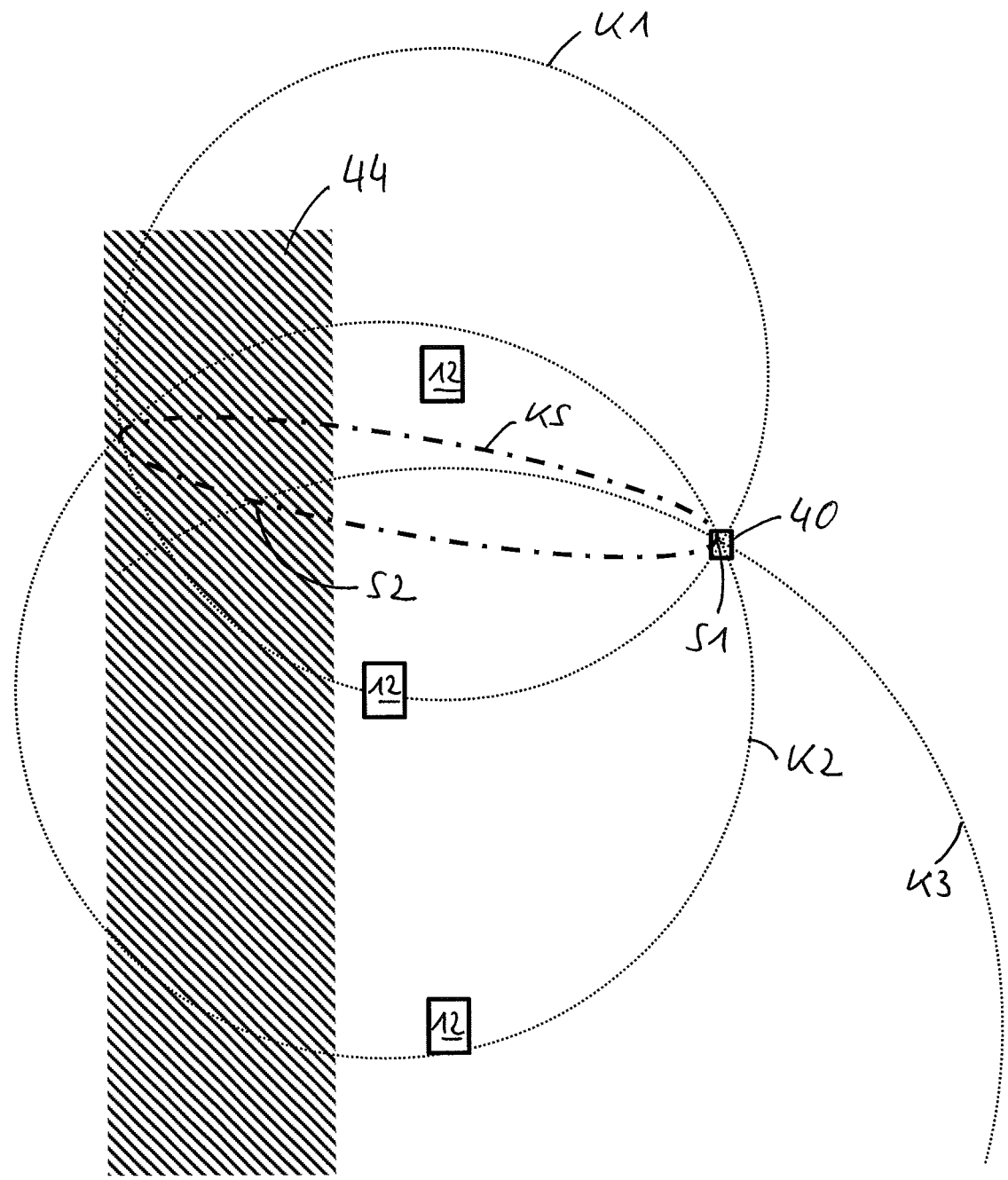

The invention will be described in the following purely by way of example with reference to the drawings. There are shown:

FIG. 1 a schematic view of a system with three radio devices for detecting parked vehicles;

FIG. 2 a schematic view of a system with two radio devices for detecting parked vehicles; and FIG. 3 schematically, the position determination of a transponder by means of three radio devices.

FIG. 1 schematically shows a first embodiment of a system 10 for detecting parked vehicles.

The system 10 comprises three radio devices 12 arranged spaced apart from one another and a monitoring system of which a camera unit 14 is shown. The camera unit 14 comprises a first camera 16 and a second camera 18.

The three radio devices 12 are arranged along a side of a street 46, with the radio devices 12 being arranged at different heights (e.g. at lampposts, not shown) and along a line deviating from a straight line.

The camera unit 14 and the radio devices 12 monitor a parking space zone 20 in which a first parking bay 22, a second parking bay 24, and a third parking bay 26 are located. The parking space zone 20 is located on a side of the street 46 disposed opposite the radio devices 12.

The following explanation only relates by way of example to three parking bays 22, 24, 26, with the system 10 being able to monitor longer streets or large areas having several hundred parking bays.

The radio devices 12 are coupled to the camera unit 14 by means of a first data connection 28, with a control device and a recognition unit (both not shown) being provided in the camera unit 14. The camera unit 14 is in turn coupled to a registration server 32 by means of a second data connection 30. The registration server 32 comprises a database 34.

If a vehicle 36 approaches the parking bays 22, 24, 26 in operation of the system 10, request signals 38 that are responded to by a recognition signal 43 from a transponder 40 in the vehicle 36 are repeatedly transmitted by the radio devices 12. A conclusion is drawn on the position of the transponder 40 by means of trilateration with reference to the time of flight up to the reception of the recognition signal 42 and/or with reference to the time of flight differences with respect to the different radio devices 12. In the position determination carried out in this manner, an excluded zone 44 is taken into account. The excluded zone 44 is not suitable or provided for parking vehicles and is located at the side of the street 46 that is disposed opposite the parking space zone 20. Residential buildings (not shown) can e.g. be located in the excluded zone 44 so that no parking hays 22, 24, 26 are present in the excluded zone 44.

FIG. 3 schematically shows the carrying out of the position determination of the transponder 40. Only the radio devices 12 and the transponder 40 are shown in FIG. 3 for better clarity. The street 46 and the parking bays 22, 24, 26 have in particular been omitted in FIG. 3.

FIG. 3 shows the position determination by means of trilateration. A spacing of each radio device 12 from the transponder 40 is here determined by a time of flight measurement of the recognition signal 42 and/or by measuring time of flight differences of the recognition signal 42 from the transponder 40 to the different radio devices 12. The distance thus determined produces a spherical volume around the respective radio device 12, with the transponder 40 having to be on a point of the surface of the spherical volume. The spherical volume or spherical surfaces thus arising are shown in simplified form in FIG. 3 as circles K1, K2, and K3.

The intersecting set of the spherical surfaces that are shown as circles K1 and K2 is an intersection signal Ks that is disposed in three dimensional space. The position of the transponder 40 must be disposed on the intersection circle KS. The intersection circle KS intersects the spherical volume of the circle K3 at a first point of intersection S1 and at a second point of intersection S2. It can be recognized that the second point of intersection S2 is disposed in the region of the exclusion zone area 44 so that the second point of intersection S1 is discarded as a possible location of the transponder 40. The position of the transponder 40 consequently has to correspond to the position of the first point of intersection S1.

As can be seen from FIG. 1, the vehicle 36 is in the first parking bay 22, which was recognized by the determination of the position of the transponder 40. The position of the vehicle 36 is repeated, for example every second, by a repeat transmission of the request signal 38 and by the repeat reception of the recognition signal 42 so that is can be determined that the vehicle 36 is permanently in the first parking bay 22.

At the same time, it is determined by the camera unit 14 that the vehicle 36 (or at least some vehicle) is located in the first parking bay 22, whereby the localization of the vehicle 36 is confirmed by means of the radio devices 12.

FIG. 2 shows a second embodiment of the system 10. The second embodiment differs from the first embodiment in accordance with FIG. 1 only in that only exactly two radio devices 12 are used to determine the position of the transponder 40. The transponder 40 also respectively transmits its installation height in the vehicle 36 in its recognition signal 42.

The procedure is then first followed as described with reference to FIG. 3 for the position determination. After the determination of the intersection circle KS, however, no points of intersection of the intersection circle KS with a further spherical volume are determined. Instead, points of intersection with a plane disposed in parallel with the ground are determined, with the location of the plane reflecting the installation height of the transponder 40. Two points of intersection with the intersection circle KS can again hereby be determined, with one of the points of intersection being able to be discarded on a location in the excluded zone 44. The remaining point of intersection then indicates the actual position of the transponder 40.

The position of the transponder 40 in three dimensional space can be determined in the above-explained manner using two or three radio devices 12.

REFERENCE NUMERAL LIST 10 system
12 radio device
14 camera unit
16 first camera
18 second camera
20 parking space zone
22 first parking bay
24 second parking bay
26 third parking bay
28 first data connection
30 second data connection
32 registration sensor
34 database
36 vehicle
38 request signal
40 transponder
42 recognition signal
44 excluded zone
46 street
K1, K2, K3 circles
KS intersection circle
S1 first point of intersection
S2 second point of intersection

The invention claimed is:

1. A method of detecting vehicles that park in a parking space zone, in which method
excluded zones are recognized and/or determined that are not suitable and/or provided for parking vehicles and are outside a parking space zone;
a transponder is arranged in or at a vehicle,
the transponder automatically repeatedly transmits a recognition signal;

the recognition signal is received by at most three radio devices; and the position of the transponder is determined by means of a control device with reference to at least one of a time of flight and time of flight differences of the recognition signal from the transponder to the radio devices and with reference to the positions of the excluded zones, wherein the position of the transponder is determined based on the assumption that the vehicle is not in the excluded zones.

2. The method in accordance with claim 1,
wherein exactly three radio devices are used for the reception of the recognition signal, with the three radio devices being arranged along a line deviating from a straight line.

3. The method in accordance with claim 1,
wherein the radio devices are arranged at at least two different heights above the ground of the parking space zone.

4. The method in accordance with claim 1,
wherein exactly two radio devices are used for the reception of the recognition signal.

5. The method in accordance with claim 4,
wherein the height of the transponder in or at the vehicle is known and/or communicated to the control device, with the control device also determining the position of the transponder with reference to the height of the transponder.

6. The method in accordance with claim 1,
wherein at least three points of intersection of surfaces of spherical volumes surrounding the radio devices are determined in the event of measurement inaccuracies, with a convex polyhedron or a convex polygon being determined on whose surfaces or edges the points of intersection lie; and
with the balance point of the polyhedron or of the polygon being determined and the balance point being used as the position of the transponder.

7. The method in accordance with claim 6,
wherein at least six points of intersection of surfaces of spherical volumes surrounding the radio devices are determined in the event of measurement inaccuracies.

8. The method in accordance with claim 1,
wherein a straight connection line runs between two radio devices in the plan view outside the parking space zone.

9. The method in accordance with claim 1,
wherein parking bays are recognized and/or determined in the parking space zone before the determination of the position of the transponder.

10. The method in accordance with claim 9,
wherein the control device determines an identification of the transponder with reference to the recognition signal, with it also being determined with reference to the recognition signal whether the vehicle has parked and if the vehicle has parked on one of the parking bays;
wherein the identification of the transponder and the parking bay used by the vehicle are transmitted to a registration server; and
the registration server outputs a status signal for the parking bay used with reference to the identification of the transponder.

11. The method in accordance with claim 10,
wherein the registration server determines an authorization status for the parking bay used with reference to the identification of the transponder, with the authorization status being included in the status signal.

12. The method in accordance with claim 10,
wherein status signals relating to a plurality of parking bays are transmitted to at least one of a car park server and a mobile display device, with said at least one of the car park server and the mobile display device indicating an overview of free and occupied parking bays with reference to the status signals.

13. The method in accordance with claim 1,
wherein the transponder transmits the recognition signal in encrypted form.

14. The method in accordance with claim 13,
wherein the recognition signal is generated by means of an asymmetrical encryption method.

15. A system comprising
at least one transponder;
up to three radio devices; and
a control device,
wherein the system is configured to carry out a method of detecting vehicles that park in a parking space zone, in which method
excluded zones are recognized and/or determined that are not suitable and/or provided for parking vehicles and are outside a parking space zone;
said at least one transponder is arranged in or at a vehicle,
the transponder automatically repeatedly transmits a recognition signal;
the recognition signal is received by said at most three radio devices; and
the position of the transponder is determined by means of the control device with reference to at least one of a time of flight and time of flight differences of the recognition signal from the transponder to the radio devices and with reference to the positions of the excluded zones, wherein the position of the transponder is determined based on the assumption that the vehicle is not in the excluded zones.

16. The system in accordance with claim 15,
wherein the radio devices are attached in or to street lamps, building fronts, street signs and/or traffic lights.

17. The system in accordance with claim 15,
further comprising a monitoring system for the optical, at least regional detection of the parking space zone, with the monitoring system comprising a camera system and a recognition unit, the recognition unit being configured to recognize free and occupied parking bays.

18. The system in accordance with claim 17,
wherein the recognition unit is configured to recognize free and occupied parking bays by means of image processing.

19. The system in accordance with claim 18,
wherein the recognition unit is configured to recognize free and occupied parking bays with reference to individual frames.

* * * * *

UNITED STATES PATENT AND TRADEMARK OFFICE
CERTIFICATE OF CORRECTION

Page 1 of 1

PATENT NO.         : 10,796,575 B2
APPLICATION NO.    : 16/025172
DATED              : October 6, 2020
INVENTOR(S)        : Thomas Hohenacker and Konrad Prinz-Dreher It is certified that error appears in the above-identified patent and that said Letters Patent is hereby corrected as shown below:

On the Title Page

The German foreign priority information is missing. Insert Item (30) --DE 102017114770.5, filed July 3, 2017--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*